United States Patent [19]

Schreckenberg et al.

[11] Patent Number: 4,563,516
[45] Date of Patent: Jan. 7, 1986

[54] POLYETHER-POLYCARBONATES FOR DIALYSIS MEMBRANES

[75] Inventors: Manfred Schreckenberg, Krefeld; Rolf Dhein, Krefeld; Ralf Lange, Krefeld; Werner Waldenrath, Cologne, all of Fed. Rep. of Germany

[73] Assignee: Bayer Aktiengesellschaft, Leverkusen, Fed. Rep. of Germany

[21] Appl. No.: 640,914

[22] Filed: Aug. 15, 1984

[30] Foreign Application Priority Data

Aug. 19, 1983 [DE] Fed. Rep. of Germany ....... 3329975
Sep. 30, 1983 [DE] Fed. Rep. of Germany ....... 3335590
Mar. 10, 1984 [DE] Fed. Rep. of Germany ....... 3408803

[51] Int. Cl.$^4$ ................. C08G 63/62; B01D 39/14
[52] U.S. Cl. ................. 528/196; 210/500.2; 210/646; 210/654; 264/216; 524/611; 525/469; 528/199; 528/204
[58] Field of Search ............... 528/196, 499, 176, 193, 528/199; 210/500.2; 264/216; 525/469; 524/611

[56] References Cited

U.S. PATENT DOCUMENTS

| | | | |
|---|---|---|---|
| 3,030,335 | 4/1962 | Goldberg | 260/47 |
| 3,161,615 | 12/1964 | Goldberg | 260/47 |
| 3,275,601 | 9/1966 | Schnell et al. | 260/47 |
| 3,653,180 | 4/1972 | Juliano et al. | 55/16 |
| 3,875,112 | 4/1975 | Böckmann et al. | 260/47 XA |
| 4,048,271 | 9/1977 | Kesting | 264/4 |
| 4,054,597 | 10/1977 | Krimm et al. | 260/463 |
| 4,069,151 | 1/1978 | Higley et al. | 128/214 R |
| 4,115,358 | 9/1978 | Vestergaard | 528/196 |
| 4,160,791 | 7/1979 | Higley et al. | 525/469 |
| 4,169,868 | 10/1979 | Schreckenberg et al. | 525/439 |
| 4,217,437 | 8/1980 | Schreckenberg et al. | 528/171 |
| 4,252,922 | 2/1981 | Adelmann et al. | 525/439 |
| 4,267,303 | 5/1981 | König et al. | 528/171 |
| 4,281,101 | 7/1981 | Schreckenberg et al. | 528/196 |
| 4,308,145 | 12/1981 | Higley et al. | 210/500.2 |
| 4,333,809 | 6/1982 | Schreckenberg et al. | 204/159.14 |
| 4,400,491 | 8/1983 | Käfer et al. | 525/439 |
| 4,436,839 | 3/1984 | Behnke et al. | 521/64 |

FOREIGN PATENT DOCUMENTS

| | | |
|---|---|---|
| 715142 | 8/1965 | Canada . |
| 0046816 | 3/1982 | European Pat. Off. . |
| 0046817 | 3/1982 | European Pat. Off. . |
| 2619831 | 11/1977 | Fed. Rep. of Germany . |
| 2650533 | 5/1978 | Fed. Rep. of Germany . |
| 2907951 | 9/1980 | Fed. Rep. of Germany . |
| 2932761 | 2/1981 | Fed. Rep. of Germany . |
| 44-15433 | 7/1969 | Japan . |
| 965085 | 7/1964 | United Kingdom . |
| 1395530 | 5/1975 | United Kingdom . |
| 1500937 | 2/1978 | United Kingdom . |
| 1556898 | 11/1979 | United Kingdom . |
| 2047161 | 11/1980 | United Kingdom . |

OTHER PUBLICATIONS

Eugene Goldberg, Journal of Polymer Science, Part C, No. 4, pp. 707–730.
R. E. Kesting, J. Macromol, Sci:-Chem., A4 (3), pp. 655–664, May 1970.
E. Chiellini et al., Informations Chimie, No. 176, pp. 221–222, Apr. 1978.
B. H. Barbour et al., vol. XXI, Trans. Amer. Soc. Artif. Int. Orangs, 1975, pp. 144–155.

Primary Examiner—Theodore E. Pertilla
Attorney, Agent, or Firm—Gene Harsh; Lawrence S. Pope; Aron Preis

[57] ABSTRACT

The present invention relates to a process for the preparation of polyether-polycarbonates, a process for stabilizing the polyether-polycarbonates thus prepared, a process for the production of membranes from the polyether-polycarbonates prepared according to the invention, stabilized membranes obtainable by the process according to the invention and the use of the polyether-polycarbonate membranes obtainable by the process according to the invention for dialysis, ultrafiltration and reverse osmosis.

7 Claims, No Drawings

POLYETHER-POLYCARBONATES FOR DIALYSIS MEMBRANES

The present invention relates to a process for the preparation of segmented aliphatic-aromatic polyether-polycarbonates having molecular weights $\overline{M}w$ (weight average) of 50,000 to 350,000, preferably 100,000 to 250,000 and containing about 95% by weight to about 65% by weight of 2,2-bis-(4-hydroxyphenyl)-propane carbonate structural units of the formula (I)

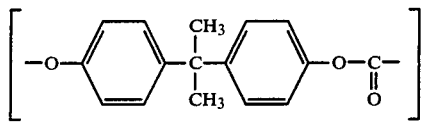

and about 5% by weight to about 35% by weight of polyether-carbonate structural units of the formula (II)

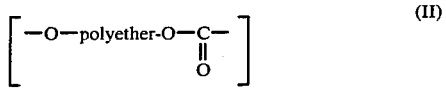

wherein -O-polyether-O- is an aliphatic polyether diolate radical having a molecular weight $\overline{M}n$ of 600 to 20,000, preferably 4,000 to 10,000, and optionally, also aryl carbonate structural units of the formula (III)

wherein Ar is a carboxylic aromatic radical with preferably 6 to 16 C-atoms, by the phase boundary process in a mixture of organic solvent and aqueous alkaline phase at temperatures of 0° C. to 35° C., preferably 10° C. to 20° C., from corresponding amounts of aliphatic polyether-diols having molecular weights $\overline{M}n$ of 600 to 20,000, preferably 4,000 to 10,000, bisphenol A, phosgene and optionally, monophenolic chain stoppers, which is characterised in that (a) phosgene is used in a molar excess of preferably 79 to 200 mol %, based on the mols of organic dihydroxy compounds, (b) the aqueous phase is kept at a pH value of at least 13 and (c) polycondensation is carried out in a reactor by adding an amine catalyst,
the polyether-polycarbonate being purified via the organic phase in a known manner, isolated and dried.

The direct incorporation of aliphatic polyether diols in the preparation of high molecular weight aliphatic-aromatic polycarbonates by the solution process has so far only been possible in the homogeneous phase by the so-called pyridine process (see, for example, U.S. Pat. No. 4,160,791), whereas when using the two-phase boundary process the aliphatic OH-groups of the polyethers have first to be converted into more reactive end groups. (See for example, "Eugene Goldberg, Journal of Polymer Science, Part C No. 4, pages 707-730, in particular 719, 1964; and German Auslegeschrift No. 1,162,259, and German Offenlegungsschrifts Nos. 2,636,783, 2,619,831, 2,636,784, 2,650,533, 2,726,416, 2,827,325, 2,837,526, European Offenlegungsschrift No. 0,004,020 and German Offenlegungsschriften Nos. 2,930,787 and 3,120,594).

Although the literature does also indicate the possibility of direct incorporation by the two-phase boundary process (see U.S. Pat. No. 3,161,615, column 6, lines 7-12, U.S. Pat. No. 3,030,335, column 5, lines 49-54 and Jap. Patent Publication No. 44-15433 by Asahi Chem. Ind. (application No. 41-33532) it does not contain any more detailed information concerning the quantity of phosgene and the pH-values to be observed.

From Canadian Patent Specification No. 715,142 (Example 8) it is known that mixed aliphatic-aromatic hydroxy compounds can be incorporated in the polycarbonate formation with their aliphatic OH groups by the phase boundary process under specific reaction conditions, whereas according to German Offenlegungsschrift No. 2,119,775 only aromatic OH groups are incorporated in the polycarbonate formation by the phase boundary process at pH values of 8 to 13.5, preferably 12 to 13.

According to German Offenlegungsschrift No. 2,446,107 aliphatic or aliphatic-aromatic polycarbonates having molecular weights of 400 to 20,000 and containing OH end groups are produced by the phase boundary process using 30 to 50% aqueous alkali solutions. Higher molecular weight polyether glycols are however not incorporated in this process. Phosgene is used in excess (see examples 1 and 3 of the German Offenlegungsschrift No. 2,446,107).

The polyether-polycarbonates obtainable by the process according to the invention occasionally exhibit ageing phenomena on storage. These manifest themselves for example, in a smell of formaldehyde or in a change in the viscosity of the material. In order to prevent this ageing the polyether-polycarbonates obtainable according to the invention can be stabilised by addition of 10 to 1,000 ppm, preferably 50 to 500 ppm, based on the weight of the polyether-polycarbonate, of a phenolic stabiliser.

The stabiliser can be added after the polycondensation and during the working up, and it is preferably added after the product has been washed with distilled water. The nature of the addition is not critical, it is necessary only to ensure uniform distribution of the stabiliser; this is best effected by dissolving the stabiliser in a solvent, for example $CH_2Cl_2$ and by adding it in this form to the solution of the polyether-polycarbonate.

The present invention thus also relates to the additional feature of the above-described production process, which feature is characterised in that (d) after the polycondensation but before the isolation of the polyether-polycarbonate a phenolic stabiliser is added, in quantities of 10 to 1,000 ppm, preferably 50 to 500 ppm, based on the weight of polyether-polycarbonate.

According to "Goldberg, loc. cit., pages 715, 716 and 726" the addition of antioxidants has only a moderately successful effect on the stability of polycarbonate films of a thickness of 6-10 mils ($\sim$150 to 250 $\mu$m) at temperatures of 100° C. to 150° C. In U.S. Pat. Nos. 3,161,615 (column 12, line 41) and 3,030,335 (column 8, line 38) only the possibility of adding a stabiliser is mentioned. In the German Offenlegungsschrifts Nos. 2,636,783, 2,636,784, 2,726,416 and 2,827,325, already mentioned, stabilisation against the effect of UV radiation and hydrolysis are described, and in German Offenlegungsschrift No. 3,120,594 only the possibility of stabilisation against the effects of moisture, heat and UV radiation is mentioned.

The polyether-polycarbonates obtainable by the process carried out according to the invention, with or without the addition of stabilisers, are excellently suitable for dialysis, ultrafiltration and reverse osmosis, in the form of membranes of a thickness of about 10 μm to about 50 μm, preferably of about 15 μm to about 30 μm and are able to be used, for example in medicine, for the purification of blood.

Thus the present invention also relates to the production of polyether-polycarbonate membranes of a thickness of 10 μm to 50 μm, preferably 15 μm to 30 μm, as an additional feature of the above-described preparation process, which feature is characterised in that, with or without the inclusion of step (d), (e) the polyether-polycarbonates, obtainable according to the invention, are dissolved in water-miscible organic solvents in quantities of 1 to 20% by weight, based on the weight of the solution, and, after filtration, are poured on to a smooth surface in a known manner to form films having a wet coating thickness of about 150 μm to about 240 μm, and after evaporating a portion of the solvent these films are hydrated several times in demineralised water.

Films or membranes of polyether-polycarbonates are known (see for example some of the literature references already cited and for example German Offenlegungsschrifts Nos. 2,152,356, 2,251,066, 2,921,138, 2,907,951, 2,932,737, 2,510,337, 2,711,498, 2,713,283 and 2,932,761, and European Offenlegungsschrifts Nos. 46,816 and 46,817).

The stabilisation of polyether-polycarbonate films of a thickness of at most about 50 μm with phenolic stabilisers is however not mentioned in the aforementioned literature; on the contrary, storage in a sterilisation agent is recommended for such thin films, i.e. for polyether-polycarbonate membranes (see German Offenlegungsschrifts Nos. 2,510,337 (page 13), 2,711,498 (page 17), 2,713,283 (page 17) and 2,932,761 (page 6) and European Offenlegungsschrifts Nos. 46,816 (page 12) and 46,817 (page 8).

The present invention thus also relates to membranes stabilised with phenolic stabilisers and having a thickness of about 10 μm to about 50 μm, preferably of about 15 μm to about 30 μm, obtainable by the process according to the invention.

The present invention further relates to the use of these stabilised membranes according to the invention for dialysis, ultrafiltration and reverse osmosis.

The use of membranes of polyether-polycarbonates for dialysis is already known (see, for example, some of the literature references already cited, as well as, for example, R. E. Kesting, J. Macromol, Sci.-Chem., A 4 (3), pages 655–664, May 1970; E. Chiellini et al., Informations Chemie No. 176, pages 221 to 222, April 1978 and B. H. Barbour et. al., Vol. XXI Trans Amer. Soc. Artif. Int. Organs, 1975, pages 144 to 155). The use of membranes of polyether-polycarbonates for ultrafiltration and for reverse osmosis is also known (see, for example, German Offenlegungsschrift No. 2,932,737, page 7). It is not however clear whether the unstabilised polyether-polycarbonate membranes obtainable by the process according to the invention have already been recommended or used for dialysis, ultrafiltration and reverse osmosis.

Thus the present invention also relates to the use of the unstabilised polyether-polycarbonate membranes obtainable by the process according to the invention for dialysis, ultrafiltration and reverse osmosis.

The process known hitherto for the production of membranes from polyether-polycarbonates have disadvantages as far as the commercial preparation of polyether-polycarbonates for membranes is concerned.

The complete removal of pyridine, which is, as is known, used in molar quantities in the preparation in homogeneous solution, is a disadvantage of the process carried out in homogeneous solution for the preparation of polyether-polycarbonates. This purification is however important on the one hand, in view of the contact of the dialysis membranes with blood and on the other hand for the improvement of the stability of the polyether-polycarbonates and the membranes produced therefrom (see also German Offenlegungsschrift No. 2,251,066 page 24 and German Auslegeschrift No. 2,932,737).

Up until now the use of the phase boundary process was only possible if the aliphatic polyethers were converted into polyethers having reactive chlorocarbonate end groups or phenolic end groups, which has the disadvantage that such polyether-polycarbonates produced by multistage processes have relatively wide variation ranges in their property tolerances. Since, compared with membranes consisting of polyether-polycarbonate, the membranes hitherto used in practice, consisting of cellulose hydrate or cellulose acetate, have poorer permeability in respect of substances with molecular weights $\overline{M}w$ of about 300 to about 5,000, there was a need to produce polyether polycarbonate membranes possessing a good combination of properties, such as, for example, good permeability to Vitamin B 12, good transparency and good bursting stability, in a simple and safe manner on an industrial scale.

The polyether-polycarbonate membranes obtainable by the process according to the invention allow improved exclusion rates and generally shorter dialysis times, in addition to improved permeabilities, the membranes being free from undesired pyridine residues and hardly exhibiting any variations in their properties.

A forced circulation mixeer can for example be used as the reactor for carrying out the polyether-polycarbonate preparation according to the invention.

The working-up of the polyether-polycarbonates prepared according to the invention commences by first separating off the alkaline phase. Then the product is washed with dilute phosphoric acid and later with distilled water until it is free from electrolytes.

The working-up can be carried out by distilling off the solvent in a forced circulation mixer and grinding the product, or by customary concentration of the solution and grinding of the product, or by spray-evaporation of the solution, or by precipitation of the polyether-carbonate from solution in hot water with removal of the organic solvent by distillation, or by precipitation from solution using organic precipitants.

The polyether-polycarbonate is then dried in a vacuum drying carbinet or with air or nitrogen.

Suitable organic solvents for the polyether-polycarbonate preparation according to the invention are those known for thermoplastic polycarbonates, such as, for example, methylene chloride, chloroform, ethylene chloride, 1,2-dichloropropane, toluene, chlorobenzene or mixtures thereof.

Suitable basic compounds for the preparation of the aqueous alkali phase are solutions of LiOH, NaOH, KOH, Ca(OH)$_2$ and/or Ba(OH)$_2$ in water.

Suitable catalysts for the polycondensation are the tertiary aliphatic amine catalysts known for polycarbonate synthesis, such as trimethylamine, triethylamine, n-tripropylamine, n-tributylamine or N-ethylpiperidine; if appropriate, the known quaternary ammonium salts, such as, for example, tetrabutylammonium bromide, can also be used.

The amounts of aqueous alkaline phase are preferably the same in volume as the amount of the total organic phase. They can also be greater or smaller in volume than the total amounts of the organic phase. The preferred pH range of the aqueous phase is pH 13–14, a pH of 14 being very particularly preferred.

Carbonic acid halides, such as, for example, phosgene or COBr$_2$, in particular phosgene, are used in a known manner as carbonate donors for the polyether-polycarbonate preparation according to the invention.

The particular reactant ratios of bisphenol A to polyethers to be employed depend on the content of hydrophilic polyether proportions and hydrophobic aromatic carbonate units to be achieved, given a quantitative conversion of the reactants.

The polyether diols to be used according to the invention are preferably polyethylene glycols such as those from Messrs. Union Carbide (Carbowax ®), British Petroleum (BP) (Breox ®), Hoechst (Polyglycol ®) and Hüls (Polywachs ®) with molecular weights $\overline{M}n$ (number-average molecular weight) of 600 to 20,000, preferably 4,000 to 10,000, a narrow molecular weight distribution being preferred. ($\overline{M}n$ is determined in a known manner by determining the OH-number).

In addition to the commercially available polyethers mentioned, other aliphatic polyethers containing OH groups can also be used according to the invention, for example polyethylene/polypropylene oxide glycols or polybutylene oxide glycols with molecular weights $\overline{M}n$ (number-average molecular weight) of 600 to 20,000, preferably 4,000 to 10,000, the $\overline{M}n$ being determined as described above.

Chain stoppers which can be used are the phenols which are usually customary, such as, for example, phenol and p-tert.-butylphenol. The amounts of the chain stoppers depend on the particular molecular weight to be established in the particular polyether-polycarbonates to be prepared, this calculation to be based on a quantitative conversion of the reactants.

The high molecular weight polyether-polycarbonates prepared by the process according to the invention should have average molecular weights $\overline{M}w$ (weight-average) of 50,000 to 350,000, preferably 100,000 to 250,000, determined by the light scattering method with a light scattering photometer. The relative solution viscosities $\eta_{rel}$ (measured on solutions of 0.5 g in 100 ml of CH$_2$Cl$_2$ at 25° C.) of the high molecular weight polyether-polycarbonates obtained by the process according to the invention are between 1.5 and 3.8, preferably between 1.6 and 3 and in particular between 2.0 and 2.8.

The polyether-polycarbonates should preferably be composed of about 70% by weight to 90% by weight of 2,2-bis-(4-hydroxyphenyl)-propane carbonate structural units of the formula (I) and 10% by weight to 30% by weight of polyether-polycarbonate structural units of the formula (II) and optionally also aryl carbonate structural units of the formula (III).

Suitable phenolic stabilisers for carrying out the process according to the invention are for example: 4-methoxyphenol, 3-tert.-butyl-4-methoxyphenol, 2-tert.-butyl-4-methoxyphenol, 4-phenoxyphenol, 2-phenoxyphenol, 2,6-di-tert.-butyl-4-methylphenol, 3-(3,5-di-tert.-butyl-4-hydroxyphenyl)-propionate (Irganox ® 1010), 1,6-hexanediol bis-3-(3,5-di-tert.-butyl-4-hydroxyphenyl)-propionate (Irganox ® 259), triethylene glycol bis-3-(tert.-butyl-4-hydroxy-5-methylphenyl)-propionate (Irganox ® 245) and 1,3,5-tris-(4-tert.-butyl-3-hydroxy-2,5-dimethylbenzyl)-1,3,5-triazine-2,4,6-(1H,3H,5H)-trione (Cyanox ® 1790).

Particularly preferred stabilisers are: 3-tert.-butyl-4-methoxyphenol, 2-tert.-butyl-4-methoxyphenol, 2,6-di-tert.-butyl-4-methylphenol, 3-(3,5-di-tert.-butyl-4-hydroxyphenyl)-propionate and 1,3,5-tris-( 4-tert.-butyl-(3-hydroxy-2,5-dimethylbenzyl)-1,3,5-triazine-2,4,6-(1H,3H,5H)-trione. These stabilisers can be used by themselves or as mixtures with one another. Preferred phenolic stabilisers are sterically hindered phenols.

Water-miscible organic solvents which are suitable for the production of membranes are for example 1,3-dioxolane, 1,3-dioxane, 1,4-dioxane, tetrahydrofuran, γ-butyrolactone, acetonitrile, dimethylformamide and dimethylsulphoxide, or mixtures of these solvents. Glass plates or polymer films can for example be used as smooth surfaces.

After the membranes have been poured on to the particular surface, they are stored, either at room temperature or at a temperature higher than room temperature, during which some of the solvent may evaporate. To prepare the finished membranes the film still containing solvent is hydrated in demineralised water several times, for example 4 to 6 times over a period of 1 to 2 hours.

The testing of the usefulness of the polyether-polycarbonate membranes obtainable by the process according to the invention is carried out essentially by first determining their transparency by preparing a solution of about 8–15% by weight of polyether-polycarbonate in 1,3-dioxolane. Films with a wet coating thickness of about 150 to about 240 μm are then drawn on a glass plate. Thereafter, the films are placed in water after invervals of 30 seconds, 1.7 minutes and 2.5 minutes. The membranes thus prepared must be transparent and clear if they are to exhibit good permeabilities as dialysis membranes. Their permeability to vitamin B 12, the rate of ultrafiltration and their bursting strength are then determined.

As already mentioned the polyether-polycarbonate membranes obtainable according to the invention are suitable, with or without the phenolic stabiliser, for dialysis such as for example haemodialysis or sequential dialysis, ultrafiltration such as for example haemofiltration, removal of pyrogens and plasma phoresis and for reverse osmosis.

In ultrafiltration, the membranes can be used for separating off water or aqueous solutions or for enriching substances dissolved in the form of macromolecules or suspensions, for demineralisation, for fractionation or for the separation of molecules with high or low molecular weights. Thus, for example, they can be used for working up biological substances, that is to say, for example, enzymes, hormones, nucleic acids and other proteins, or for the preparation of clinical samples for analysis, or for removing pyrogens, viruses and bacteria, or for isolating metabolism products from fermentation processes, or for electrophoresis or immunoelectrophoresis.

In the following examples the investigations by gel chromatography are carried out in tetrahydrofuran on Styragel columns (separation range $1\times10^3$ Å, $1\times10^4$ Å, $1\times10^5$ Å and $1\times10^6$ Å) at room temperature. The calibration of bisphenol A polycarbonate was used for the determination. No great deviations were found in comparison with $\overline{M}w$ determination by the light scattering method.

Comparison experiment according to U.S. Pat. No. 4,160,791,(pyridine process). Preparation of a polyether-polycarbonate of 77% by weight of 2,2-bis-(4-hydroxyphenyl)-propane polycarbonate and 23% by weight of polyethylene oxide glycol($\overline{M}n$ 8000).

Gaseous phosgene is passed, at a rate of 570 ml/minute, into a solution of 360 g (1.58 mol) of 2,2-(4,4'-dihydroxydiphenyl)-propane (bisphenol A), 120 g of polyethylene glycol of average molecular weight $\overline{M}n$ 8,000, 384 ml (4.77 mol) of pyridine and 2,700 ml of methylene chloride, with vigorous stirring. The temperature is kept at 25±0.5° C. with an ice-water bath. After 90 minutes, crystals of pyridine hydrochloride form. A solution of 0.25 g of phenol in 12 ml of methylene chloride is now added. Further phosgene is passed in at the same rate until a stable, slightly pink coloration of the reaction solution, indicating the end of the reaction, is formed (a further 70 minutes). The polymer formed is then precipitated by stirring the very viscous reaction mixture with a solution of 5,178 ml of acetone, 1,290 ml of water and 198 ml of concentrated hydrochloric acid. The gelatinous precipitate is then processed with hot water in a mixer to a solids/water mixture, which is then transferred to a filter and washed with hot water. After drying at 50° C. in vacuo, 480 g of a white copolymer are obtained. Analysis by IR spectroscopy shows that the polymer has a polyether content of 22.8% by weight and a polycarbonate content of 77.8% by weight, and a relative viscosity $\eta_{rel}$ of 1.86. According to investigation by gel chromatography, the polymer has an $\overline{M}w$ of 140,400, an $\overline{M}n$ of 12,200 and a heterogeneity H of 10.5 (H=$\overline{M}w/\overline{M}n$−1).

EXAMPLE 1

Preparation of a polyether-polycarbonate of 23% by weight of polyethylene oxide glycol ($\overline{M}n$ 8,000) and 77% by weight of 2,2-bis-(4-hydroxyphenyl)-propane poly-carbonate 35 liters of distilled water, 2.074 kg of 2,2-bis-(4-hydroxyphenyl)-propane (bisphenol A) and 1.5 kg of 50% strength sodium hydroxide solution are introduced into a stirred kettle, with intensive stirring. 35 liters of methylene chloride and 0.69 kg of polyethylene oxide glycol having an average molecular weight $\overline{M}n$ of 8,000 are added to this solution. The mixture is then stirred until all of the polyether has dissolved. 2.245 kg of phosgene (150 mol % excess of phosgene, based on bisphenol A) are now passed in at 15° C. in the course of 100 minutes, whilst about 3.3 liters of 50% strength sodium hydroxide solution are at the same time metered in, the pH being kept constant at 14. After the introduction of the phosgene, 20 liters of methylene chloride and 10.27 g of N-ethylpiperidine (1 mol % of amine, based on bisphenol A) are added. The mixture is then stirred for a further hour. The organic phase is separated off via a separator and washed successively with 2% strength phosphoric acid, if necessary with addition of a demulsifier, and finally with distilled water, until free from electrolytes. After the water has been removed, the organic solution is concentrated and the polyether-polycarbonate is then dried at 50° C. in a vacuum drying cabinet.

The polyether-polycarbonate isolated has a relative viscosity $\eta_{rel}$ of 2.48.

According to investigation by gel chromatography, the entire polyether is incorporated in the co-condensate.

According to this investigation, the polymer has the following parameters:

$\overline{M}w$ of 228,100
$\overline{M}n$ of 18,800
H=$\overline{M}w/\overline{M}n$−1=11

IR analysis shows that the polymer consists of 22.7% of polyether and 77.3% of polycarbonate.

EXAMPLE 2

Preparation of a polyether-polycarbonate of 23% by weight of polyethylene oxide glycol ($\overline{M}n$ 6,000) and 77% by weight of 2,2-bis-(4-hydroxyphenyl)-propane polycarbonate 7.45 liters of distilled water, 0.715 liter of 50% strength sodium hydroxide solution and 2.074 kg of 2,2-bis-(4-hydroxyphenyl)-propane (bisphenol A) are initially introduced into a stirred kettle, with intensive stirring and under a nitrogen atmosphere. After the bisphenol A has been suspended, 5.1 liters of methylene chloride and 0.690 kg of polyethylene oxide glycol with an average molecular weight $\overline{M}n$ of 6,000 are added. The mixture is then stirred until all of the polyether has dissolved. 2.245 kg of phosgene (150 mol % excess of phosgene, based on bisphenol A) are now passed in at 15° C. in the course of 100 minutes, whilst about 3.6 liters of 50% strength sodium hydroxide solution are at the same time metered in, the pH being kept constant at 14.

The reaction mixture is introduced into a forced circulation mixer and a solution of 10.27 g of N-ethylpiperidine (1 mol % of amine, based on bisphenol A) and 100 ml of methylene chloride is added. After 45 minutes, with the pH kept constant at 14, a high molecular weight product is obtained. The reaction mixture is processed to a paste-like mass for a further 30 minutes, if necessary with addition of methylene chloride.

The alkaline, aqueous phase is then drained off and washed with distilled water until the pH is 10. The paste in the forced circulation mixer is now washed twice with dilute phosphoric acid. It is then washed with distilled water until the product is free from electrolytes. Towards the end of washing operation, the product breaks up into beads, methylene chloride evaporating off. The polyether-polycarbonate can then be ground and dried for 24 hours in a vacuum drying cabinet or with air or with nitrogen at 50°–60° C.

The polyether-polycarbonate thus isolated has a relative viscosity $\eta_{rel}$ of 2.44.

According to analysis by gel chromatography, the polyether is completely incorporated in the co-condensate. According to this investigation, the polymer has a
$\overline{M}w$ of 189,900
$\overline{M}n$ of 17,790
H of $\overline{M}w/\overline{M}n$−1=9.67

IR analysis shows that the polymer consists of 22.8% by weight of polyether and 77.2% by weight of bisphenol A polycarbonate.

EXAMPLE 3

Preparation of a polyether-polycarbonate of 19% by weight of polyethylene oxide glycol ($\overline{M}n$ 8,000) and 81% by weight of 2,2-bis-(4-hydroxyphenyl)-propane polycarbonate 7.45 liters of distilled water, 0.75 liter of 50% strength sodium hydroxide solution, 2.181 kg of 2,2-bis-(4-hydroxyphenyl)-propane (bisphenol A) and 6 g of p-tert.-butylphenol, as a chain stopper, are initially introduced into a stirred kettle, with intensive stirring and under a nitrogen atmosphere. After the bisphenol A has been suspended, 5.1 liters of methylene chloride and 0.57 kg of polyethylene oxide glycol with an average molecular weight $\overline{M}n$ of 8,000 are added. The mixture is then stirred until all of the polyether has dissolved. 2.36 kg of phosgene (150 mol % excess, based on bisphenol A) are now passed in at 15° C. in the course of 100 minutes, whilst about 3.8 liters of 50% strength sodium hydroxide solution are at the same time metered in, the pH being kept constant at 14. The reaction mixture is introduced into a forced circulation mixer and a solution of 10.8 g of N-ethylpiperidine and 100 ml of methylene chloride is added. After about 45 minutes, with the pH kept constant at 14, a high molecular weight product is obtained. Further working up of the copolymer is carried out according to Example 2.

The polyether-polycarbonate isolated has a relative viscosity $\eta_{rel}$ of 2.68.

According to analysis by gel chromatography, the polyether is completely incorporated in the co-condensate. According to this investigation, the polymer has the following parameters:

$\overline{M}w$ of 212,700
$\overline{M}n$ of 24,500
$H = \overline{M}w/\overline{M}n - 1 = 7.68$ IR analysis shows that the polymer consists of 18.8% by weight of polyether and 81.2% by weight of bisphenol A polycarbonate.

EXAMPLE 4

Preparation of a stabilised polyether-polycarbonate of 23% by weight of polyethylene oxide glycol ($\overline{M}n$ 8,000) and 77% by weight of 2,2-bis-(4-hydroxyphenyl)-propane polycarbonate According to Example 1, 2.074 kg of 2,2-bis-(4-hydroxyphenyl)-propane, 0.69 kg of polyethylene oxide glycol, $\overline{M}n$ 8,000, and 2.245 kg of phosgene are reacted by the phase boundary process, with intensive stirring, and the product is then co-condensed with 10.27 g of N-ethylpiperidine. After purification of the organic phase (according to Example 1) in a separator until it is free from electrolytes, the water is removed from the organic phase.

0.3 g (100 ppm) of 1,3,5-tris-(4-tert.-butyl-3-hydroxy-2,5-dimethylbenzyl)-1,3,5-triazine-2,4,6-(1H,3H,5H)-trione, dissolved in 50 ml of methylene chloride, is added to the organic phase.

The organic solution is concentrated. The polyether-polycarbonate is then dried at 50° C. in a vacuum drying cabinet.

The polyether-polycarbonate isolated has a viscosity $\eta_{rel}$ of 2.58.

EXAMPLE 5

Preparation of a stabilised polyether-polycarbonate of 23% by weight of polyethylene oxide glycol ($\overline{M}n$ 6,000) and 77% by weight of 2,2-bis-(4-hydroxyphenyl)-propane According to Example 2, 2.074 kg of 2,2-bis-(4-hydroxyphenyl)-propane, 0.69 kg of polyethylene oxide glycol ($\overline{M}n$ 6,000) and 2.245 of phosgene are reacted by the phase boundary process, with intensive stirring. A co-condensation reaction is then carried out in a forced circulation mixer by addition of 10.27 g of N-ethylpiperidine, and the product is then washed according to Example 2 until free from electrolytes. 0.3 g (100 ppm) of 1,3,5-tris-(4-tert.-butyl-3-hydroxy-2,5-dimethylbenzyl)-1,3,5-triazine-2,4,6-(1H,3H,5H)-trione, dissolved in 50 ml of methylene chloride (if appropriate also as a powder), is then added to the paste-like mass. The components are then mixed until the polyether-polycarbonate breaks up into beads. Further working up is effected by grinding and drying in a vacuum drying cabinet at 50° C.

The polyether-polycarbonate isolated has a relative viscosity $\eta_{rel}$ of 2.56.

EXAMPLE 6

Preparation of a stabilised polyether-polycarbonate of 19% by weight of polyethylene oxide glycol ($\overline{M}n$ 8,000) and 81% by weight of 2,2-bis-(4-hydroxyphenyl)-propane polycarbonate According to Example 3, 2.181 kg of 2,2-bis-(4-hydroxyphenyl)-propane, 6 g of p-tert.-butylphenol, 0.57 kg of polyethylene oxide glycol ($\overline{M}n$ 8,000) and 2.36 kg of phosgene are reacted by the phase boundary process, with intensive stirring. A co-condensation reaction is then carried out in a forced circulation mixer by addition of 10.8 g of N-ethylpiperidine and the product is washed according to Example 2, until free from electrolytes. 0.3 g (100 ppm) of 1,3,5-tris-(4-tert.-butyl-3-hydroxy-2,5-dimethylbenzyl)-1,3,5-triazine-2,4,6-(1H,3H,5H)-trione, dissolved in 50 ml of methylene chloride, is then added to the paste-like mass. The components are then mixed until the polyether-polycarbonate breaks up into beads. Further working up is effected by grinding and drying in a vacuum drying cabinet at 50° C.

The polyether-polycarbonate isolated has a relative viscosity $\eta_{rel}$ of 2.81.

Membrane preparation and testing 12 g of the polyether-polycarbonate of the comparison experiment and of Examples 1 to 3 are dissolved in 88 g of 1,3-dioxolane at 70° C., with stirring.

The solution is filtered over a pressure filter and the cooled to room temperature. The solution is drawn onto a glass plate with a doctor blade in a dust-free atmosphere. After 1.7 minutes, the 100–150 μm thick film containing solvent is placed in distilled water at room temperature.

The membrane formed is stored in water at room temperature for 2 hours.

Its permeability to vitamin $B_{12}$, the ultrafiltration rate (UFR) and the bursting strength are then determined.

The results are summarised in Tables I and II. Table III shows the stabilising influence, in experiments, of phenolic stabilisers during drying with air at different temperatures and after storage, in comparison with non-stabilised polyether-polycarbonates.

TABLE I

| Flat membrane | Ultrafiltration rate $\left[UFR = \dfrac{ml}{h \times m^2 \times mm\ Hg}\right]$ | Differential permeability [Vitamin $B_{12}$ = cm/second] | [chloride = cm/second] | Bursting strength [cm Hg] | Thickness [μm] |
|---|---|---|---|---|---|
| Comparison experiment | $2.7 \times 10^{-3}$ | $1.6 \times 10^{-4}$ | $10.5 \times 10^{-4}$ | 21 | 17 |
| Example 1 | $5.3 \times 10^{-3}$ | $2.0 \times 10^{-4}$ | $11.2 \times 10^{-4}$ | 33 | 17 |
| Example 2 | $2.2 \times 10^{-3}$ | $1.4 \times 10^{-4}$ | $9.9 \times 10^{-4}$ | 23 | 17 |
| Example 3 | $1.06 \times 10^{-3}$ | $1.8 \times 10^{-4}$ | $8.8 \times 10^{-4}$ | 25 | 17 |

TABLE II

Optical appearance of the membrane

| Product | Appearance of the membranes after different storage times of the solvent-containing films in air before immersion in water | | |
|---|---|---|---|
| | 0.5 minute | 1.7 minutes | 2.5 minutes |
| Comparison experiment | almost transparent | transparent | transparent |
| Example 1 | almost transparent | " | " |
| Example 2 | almost transparent | " | " |
| Example 3 | almost transparent | " | " |

TABLE III

Experiments on the stabilisation of polyether-polycarbonates

| Example | Stabilisers [ppm] | Drying 1 (24 hours at 50° C. with air) [η rel] | Drying 2 (24 hours at 90° C. with air) [η rel] | After storage for 2 months at 25° C. | | | |
|---|---|---|---|---|---|---|---|
| | | | | Drying 1 | | Drying 2 | |
| | | | | [η rel] | Formalin odour | [η rel] | Formalin odour |
| 1 | — | 2.38 | 2.15 | 2.29 | slight odour | 2.01 | odour |
| 2 | — | 2.32 | 2.09 | 2.20 | slight odour | 1.97 | odour |
| 3 | — | 2.46 | 2.16 | 2.28 | odour | 2.13 | odour |
| 4 | 100 (A) | 2.56 | 2.54 | 2.55 | no odour | 2.54 | no odour |
| 5 | 100 (A) | 2.55 | 2.53 | 2.56 | " | 2.52 | " |
| 6 | 100 (A) | 2.78 | 2.76 | 2.78 | " | 2.74 | " |
| 6a | 200 (A) | 2.79 | 2.76 | 2.78 | " | 2.74 | " |
| 6b | 100 (B) | 2.62 | 2.59 | 2.60 | " | 2.58 | " |
| 6c | 200 (B) | 2.65 | 2.60 | 2.62 | " | 2.58 | " |
| 6d | 100 (C) | 2.73 | 2.69 | 2.71 | " | 2.68 | " |
| 6e | 200 (C) | 2.75 | 2.70 | 2.74 | " | 2.70 | " |

(A) = 1,3,5-Tris-(4-tert.-butyl-3-hydroxy-2,5-dimethylbenzyl)-1,3,5-triazine-2,4,6-(1H,3H,5H)-trione
(B) = 2-tert.-Butyl-4-methoxyphenol
(C) = 3-(3,5-Di-tert.-buty-4-hydroxyphenyl)-propionate

We claim:

1. A process for the preparation of segmented aliphatic aromatic polyether-polycarbonates having $\overline{M}w$ (weight-average) of 50,000 to 350,000 and containing about 95% by weight to about 65% by weight of 2,2-bis-(4-hydroxyphenyl)-propane carbonate structural units of the formula I

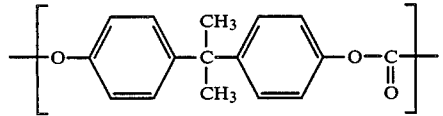

and about 5% by weight to about 35% by weight of polyether-polycarbonate structural units of the formula II

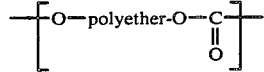

wherein O-polyether-O- is an aliphatic polyether diolate radical having an $\overline{M}_n$ of 600 to 20,000 by the phase boundary process in a mixture of organic solvent, and aqueous alkaline phase at temperatures of 0° C. to 35° C. from corresponding quantities of aliphatic polyether diols having $\overline{M}_n$ of 600 to 20,000, bisphenol A and phosgene, characterized in that (a) phosgene is used in a molar excess, based on the mols of organic dihydroxy compounds, (b) the aqueous phase is kept at a pH value of at least 13 and (c) polycondensation is carried out in a reactor by the addition of an amine catalyst, the polyether-polycarbonate being purified via the organic phase, isolated and dried.

2. A process for the production of a polyether-polycarbonate membrane of a thickness of between about 10 and 50 μm comprising (1) preparing a segmented aliphatic aromatic polyether-polycarbonate having a weight average molecular weight ($\overline{M}_w$) of between about 50,000 and 350,000 and containing between about 95 and 65 weight percent of 2,2-bis-(4-hydroxyphenyl)-propane carbonate structural units of the formula I:

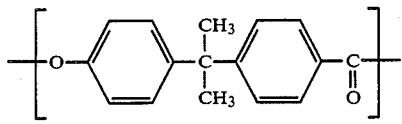

and between about 5 and 35 weight percent of polyether-polycarbonate structural units of the formula II

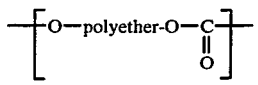

wherein O-polyether-O- is an aliphatic polyether diolate radical having a number average molecular weight ($\overline{M}_n$) of between about 600 and 20,000; by reacting 2,2-bis-(4-hydroxyphenyl)-propane and at least one aliphatic polyether diol by the phase boundary process;
(a) in a mixture of an organic solvent for the final polyether-polycarbonate and an aqueous alkaline phase with which the organic solvent is immiscible;
(b) at a temperature between about 0° and 35° C.;
(c) with a molar excess of phosgene based on the mols of organic dihydroxy compounds,
(d) while keeping the pH of the aqueous alkaline phase at a value of at least about 13;
(e) following the initial reaction with polycondensation in the presence of an amine catalyst in the organic solvent;
(f) purifying the organic solvent solution of the polyether-polycarbonate; and
(g) isolating the polyether-polycarbonate from the solvent and drying it; and
(2) dissolving the polyether-polycarbonate in at least one organic water miscible solvent to a concentration between about 1 and 20 weight percent, based on the weight of the solution;
(3) filtering this solution;
(4) drawing a wet film of between about 150 and 240 μm onto a smooth surface;
(5) evaporating off a portion of this water miscible solvent; and
(6) hydrating the film several times with demineralized water.

3. Process according to claim 1 or 2, characterised in that
(d) following polycondensation, but prior to the isolation of the polyether-polycarbonate a phenolic stabiliser is added in quantities of 10 to 1,000 ppm, based on the weight of the polyether-polycarbonate.

4. The process of claim 1 wherein said polyether carbonate further contains aryl carbonate structural units of the formula II

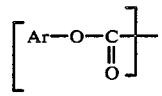

wherein Ar is a carbocyclic, aromatic radical, said units being the derivatives of monophenolic chain stoppers which are introduced in said mixture.

5. The process of claim 2 wherein said phase boundary process further comprises adding a monohydroxy aromatic compound.

6. The process of claim 1 wherein said aqueous phase is kept at a pH value of 13 to 14.

7. The process of claim 1 wherein said aqueous phase is kept at a pH value of 14.

* * * * *